United States Patent

Shibanushi

[11] Patent Number: 5,660,513
[45] Date of Patent: Aug. 26, 1997

[54] STUD CLIP HAVING DIFFERENT INSERTION/WITHDRAWAL FORCES

[75] Inventor: Yoshio Shibanushi, Yokohama, Japan

[73] Assignee: Illinois Tool Works Inc., Glenview, Ill.

[21] Appl. No.: 677,215

[22] Filed: Jul. 9, 1996

[30] Foreign Application Priority Data

Jul. 19, 1995 [JP] Japan ............................. 7-20413
Jul. 19, 1995 [JP] Japan ............................. 7-204014

[51] Int. Cl.$^6$ .............................. F16B 37/08; F16B 37/16
[52] U.S. Cl. .................... 411/433; 411/437; 411/512; 411/908
[58] Field of Search ........................... 411/433, 437, 411/508, 509, 510, 512, 908, 913; 248/73

[56] References Cited

U.S. PATENT DOCUMENTS

| | | | |
|---|---|---|---|
| 4,541,153 | 9/1985 | Schaty | 411/437 X |
| 4,728,236 | 3/1988 | Kraus | 411/437 |
| 4,902,182 | 2/1990 | Lewis | 411/913 X |
| 5,098,242 | 3/1992 | Schaty | 411/512 X |
| 5,154,376 | 10/1992 | Baum et al. | 248/73 X |

FOREIGN PATENT DOCUMENTS 61-52710  4/1986  Japan.

*Primary Examiner*—Neill R. Wilson
*Attorney, Agent, or Firm*—Schwartz & Weinrieb

[57] ABSTRACT

A stud clip for mating with a threaded stud bolt projecting outwardly from a base member, such as, for example, an automobile body, is used to mount an elongate article, such as, for example, an automobile fuel line, upon the automobile body. The stud clip comprises a plurality of latch members for engaging a threaded shank portion of the stud bolt, and the latch members have a predetermined thickness dimension, which determines the flexibility or rigidity of such latch members, in order to provide the latch clip with a relatively low or small insertion force, however, in order to provide the stud clip with a relatively high or large withdrawal or pull-off force, stopper members are provided in conjunction with and beneath the latch members so as to prevent the latch members from bending or flexing in the opposite direction attendant the attempted withdrawal or removal of the stud clip from the threaded stud bolt. Consequently, the withdrawal or pull-off force is substantially increased or enhanced.

20 Claims, 2 Drawing Sheets

STUD CLIP HAVING DIFFERENT INSERTION/WITHDRAWAL FORCES

FIELD OF THE INVENTION

The present invention relates generally to stud clips, and more particularly to a stud clip which is particularly adapted for mating with a threaded bolt or stud, which is affixed to a base member, such as, for example, an automobile body, so as to secure an attachment member, such as, for example, a fuel pipe, to the automobile body.

BACKGROUND OF THE INVENTION

Stud clips are of course well known in the art, and an exemplary stud clip is disclosed within FIG. 4 of the drawings of the present patent application which corresponds to FIG. 4 of Japanese Utility Model Patent Publication SHO 61-52710. More particularly, as disclosed within the noted drawings and the patent publication, the automobile body is shown at B, and a threaded bolt or stud S is affixed to the body B by means of its flange f by any suitable means, such as, for example, welding. A pipe P, which may be, for example, a fuel pipe that supplies fuel to the automobile engine, is adapted to be fixedly mounted upon the automobile body B through means of a stud clip, generally indicated by the reference character 1, which is to be fixedly secured to the automobile body B by engaging the threaded stud bolt S.

The stud clip 1 is seen to comprise a housing 11, two sets of oppositely disposed latch members or detents 21 disposed within an interior cavity 13h of the housing 11 and arranged in tiered arrays, and a pair of pipe holding fixtures 41 disposed upon opposite sides of the housing 11. The housing 11 further comprises a lower wall 12 which is provided with a through-aperture 12h so as to permit the housing 11 to be mounted over the upstanding threaded bolt or stud S whereby the stud bolt S projects into the interior cavity 13h of the housing 11 such that the latch members or detents 21 can engage the threaded portion e of the bolt or stud S, and the lower wall 12 also comprises a recessed portion 12d for accommodating the flange f of the stud bolt S. The housing 11 additionally comprises a peripheral side wall 13, and an upper wall 14 is disposed upon the upper end of side wall 13 and is provided with a through-aperture 14h which is coaxially aligned with the through-aperture 12h defined within the lower wall 12 and permits the upper free end of the stud bolt S to be disposed therein or to pass therethrough. The pipe holding fixtures 41 consist of pipe holding arms 42 which support pipes P therein, and pipe retaining arms 43 which engage the pipes P once the pipes P are disposed within the cavities defined within pipe holding arms 42 so as to fixedly retain the pipes P within the pipe holding arms 42. The housing 11, latch members 21, and pipe holding fixtures 41 comprise a one-piece molding which may be fabricated from a suitable synthetic resin material.

When it is desired to fixedly mount or secure one or more of the fuel pipes P to the automobile body B, the pipes P are respectively inserted between the holding arms 42 and the retaining arms 43 whereupon relative outward expansion of the holding arms 42 and the retaining arms 43 with respect to each other, the pipes P are inserted within the cavities or sockets defined by the holding arms 42 and are fixedly retained therein by the retaining arms 43. Subsequently, with the pipes P assembled within the stud clip 1, the stud clip 1 is ready to be mounted upon the stud bolt S which has been previously affixed, such as, for example, by welding the same, to the particular surface of the automobile body B by means of its flange f such that the stud bolt S projects upwardly from the surface of automobile body B. Accordingly, the stud clip 1 is mounted upon the stud bolt S by disposing the lower wall 12 toward the automobile body B and inserting the stud bolt S through the aperture 12h of the stud clip 1 such that the free upwardly extending distal end of the stud bolt S is inserted into the interior cavity 13h of the stud clip 1 and engages the latch members 21 so as to expand the sets of oppositely disposed latch members 21 radially outwardly with respect to each other. The inherent elasticity of the latch members 21 causes the same to engage the threaded portion e of the stud bolt S whereby the stud clip 1, and the pipe members P mounted thereon, are fixedly mounted and retained upon the stud bolt S.

While the conventional or PRIOR ART stud clip 1, disclosed within FIG. 4 of the present application drawings, as well as within FIG. 4 of the aforenoted Japanese Utility Model Patent Publication, and as has been described hereinabove, obviously functions sufficiently well in order to remain retained upon the threaded stud bolt S so as to in turn maintain, for example, the fuel pipes P secured or affixed to the automobile body B, both the insertion force required for attaching, mounting, or inserting the stud clip 1 onto the upstanding stud bolt S, as well as the removal, retention, withdrawal, or pull-off force required for releasing the stud clip 1 from the threaded bolt or stud S, are dependent upon or are direct functions of the thickness, and therefore the rigidity, of the latch members or detents 21. Consequently, if the latch members or detents 21 are fabricated so as to be relatively thin, the insertion force is desirably reduced or relatively low or small, however, the removal, withdrawal, or pull-off force is also undesirably reduced or relatively low or small. Alternatively, if the latch members or detents 21 are fabricated so as to be relatively thick, while the removal or pull-off force may be desirably increased or relatively high or large, the insertion force is also undesirably increased or relatively high or large. It has thus been difficult to fabricate a stud clip wherein the insertion force is desirably reduced or relatively low or small while the removal or pull-off force is desirably increased or relatively high or large, and a need therefore exists in the art for a stud clip which can function as intended and which also exhibits the desired insertion force and removal force parameters or characteristics.

OBJECTS OF THE INVENTION

Accordingly, it is an object of the present invention to provide a new and improved stud clip for mating with a threaded stud bolt, fixedly mounted upon a base member, so as to retain another member in a fixed position upon the base member.

Another object of the present invention is to provide a new and improved stud clip which overcomes the various drawbacks or disadvantages characteristic of the prior art stud clips conventionally employed in connection with threaded bolts or studs affixed to and projecting outwardly from base members.

A further object of the present invention is to provide a new and improved stud clip wherein the insertion force characteristic thereof is relatively low or small, while the removal or pull-off force characteristic thereof is relatively high or large, and yet the stud clip is also fixedly retained upon the stud bolt in a manner in which no rattling of the stud clip with respect to the stud bolt occurs.

SUMMARY OF THE INVENTION

The foregoing and other objectives are achieved in accordance with the present invention through the provision of a new and improved stud clip wherein the clip comprises two sets of oppositely disposed latch members or detents for engaging the threaded shank portion of the upstanding stud or bolt. Each set of latch members or detents is divided into upper and lower latch members or detents wherein the upper latch members or detents are fabricated such that the thickness dimensions thereof are substantially uniform, whereas in the case of the lower latch members or detents, the proximal end portions of such lower latch members or detents, by means of which such lower latch members or detents are attached to the stud clip housing, are fabricated such that the thickness dimensions thereof are less than the thickness dimensions of the upper latch members or detents. Alternatively, the lower latch members or detents may be fabricated such that their thickness dimensions thereof are substantially uniform but nevertheless less than those of the upper latch members or detents.

The distal end portions of the upper latch members or detents are also disposed at greater inclined angles with respect to the axis of the stud clip, along which the stud bolt is disposed, than the distal end portions of the lower latch members or detents, and this composite structure serves to define a relatively low or small insertion force characteristic of the stud clip with respect to the stud bolt upon which the stud clip is to be mounted. In connection with the withdrawal, removal, or pull-off force characteristic of the stud clip, stopper members are disposed beneath each tier of the lower latch members or detents so as to effectively prevent the same from bending in a direction opposite to that in which the lower latch members or detents were moved or expanded by the stud bolt when the stud clip was mounted upon the stud bolt so that the removal or pull-off force characteristic of the stud clip is substantially increased or enhanced. The relatively thicker upper latch members or detents also contribute to the enhanced or increased withdrawal, removal, or pull-off force characteristic of the stud clip, and in addition, the higher rigidity of the relatively thicker upper latch members or detents when engaged with the threaded shank portion of the stud bolt serves to positionally retain the stud clip upon the stud bolt without the stud clip exhibiting any rattling or vibrational noise.

BRIEF DESCRIPTION OF THE DRAWINGS

Various other objects, features, and attendant advantages of the present invention will be more fully appreciated from the following detailed description when considered in connection with the accompanying drawings in which like reference characters designate like or corresponding parts throughout the several views, and wherein.

DETAILED DESCRIPTION OF THE PREFERRED EMBODIMENT

Figure 1:
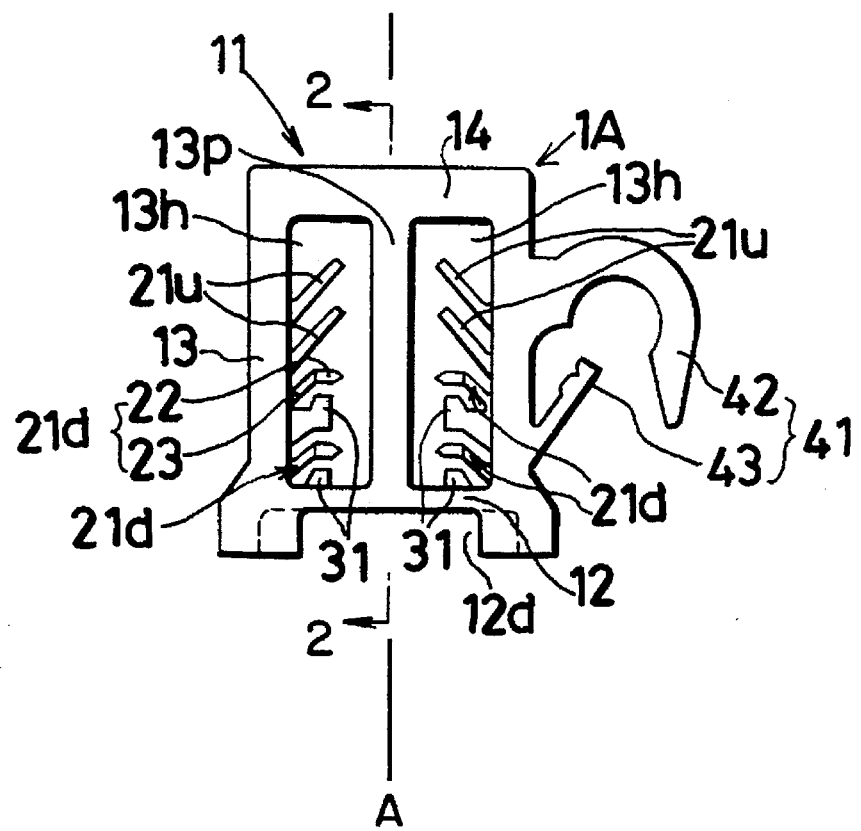
FIG. 1 is a front elevational view of a new and improved stud clip constructed in accordance with the teachings of the present invention and showing its cooperative parts.
Figure 2:
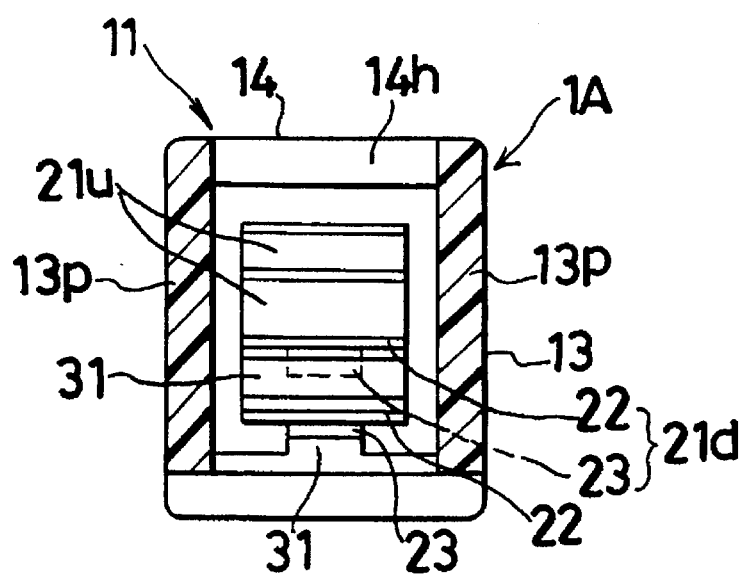
FIG. 2 is a cross-sectional view of the new and improved stud clip of the present invention as shown in FIG. 1 and as taken along line 2—2 of FIG. 1.
Figure 3:
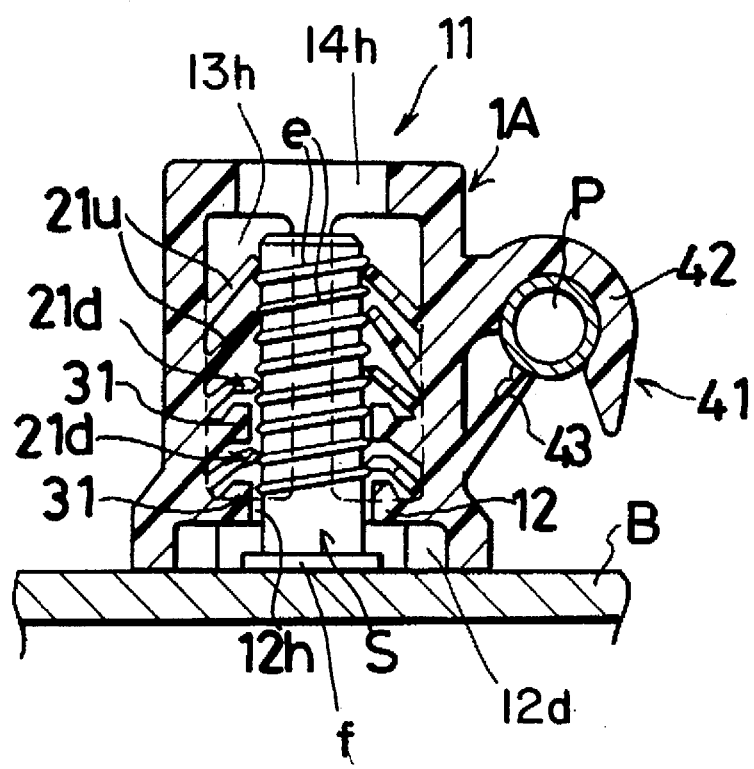
FIG. 3 is a cross-sectional view of the new and improved stud clip of the present invention as shown in FIG. 1 and shown in this figure in use for retaining and securing a plurality of fuel pipes upon an automobile body.
Figure 4:
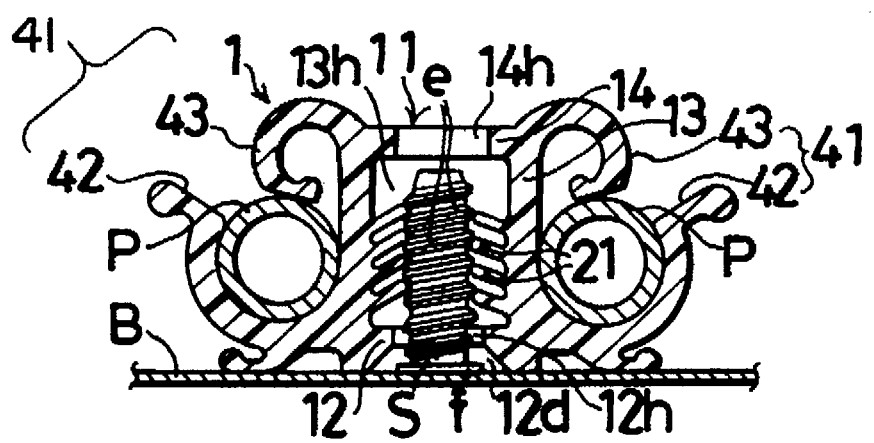
FIG. 4 is a view similar to that of FIG. 3 showing however a conventional PRIOR ART stud clip when the same is used to secure and retain a plurality of fuel pipes upon an automobile body.

Referring now to the drawings, and more particularly to FIGS. 1–3 thereof, the new and improved stud clip constructed in accordance with the present invention is generally indicated by the reference character 1A and is seen to comprise a housing 11 having a lower wall 12, a peripheral side wall 13 which includes a pair of oppositely disposed support pillars 13p, an interior cavity 13h defined within the housing 11, and an upper wall 14. Two sets of oppositely disposed, vertically spaced latch members or detents are provided interiorly of the housing 11 so as to be disposed within the cavity 13h of the housing 11, and each set of latch members or detents is divided into a pair of upper latch members or detents 21u and a pair of lower latch members or detents 21d. The stud clip 1A further comprises at least one pipe holding fixture 41 which comprises a pipe holding arm 42 and a pipe retaining arm 43 operatively associated with the pipe holding arm 42 so as to retain, for example, an automobile fuel pipe P within the recess or socket portion of the pipe holding arm 42.

The latch members or detents 21u and 21d are all integrally mounted upon the peripheral side wall 13, and it is seen that the free distal end portions of the upper latch members 21u are disposed at a greater angular inclination with respect to the vertical axis A of the stud clip 1A than the free distal end portions of the lower latch members or detents 21d which are seen to be disposed substantially perpendicular to the axis A. The thickness dimensions of the upper latch members or detents 21u are substantially uniform throughout the lengths thereof, whereas in the case of the lower latch members or detents 21d, the proximal end portions 23 thereof are thinner or have smaller thickness dimensions than the distal end portions thereof upon which latch claws 22 are provided, and in addition, the thickness dimensions of the proximal end portions 23 of the lower latch members or detents 21d are less than the thickness dimensions of the upper latch members or detents 21u. It is further seen that below and operatively associated with each one of the lower latch members or detents 21d there is provided a stopper member 31 which depending upon which lower latch member or detent the particular stopper member 31 is operatively associated with, the stopper member 31 may be mounted upon the peripheral side wall 13 of the housing 11 or upon the lower wall 12 of the housing. The housing 11, the latch or detent members 21d,21u, the stopper members 31, and the pipe holding fixtures 41 all comprise a one-piece integrally molded component which may be fabricated from a suitable synthetic resin material.

With reference now being made to FIGS. 1 and 3, it can be appreciated that when an elongate member, such as, for example, a fuel pipe P is desired to be secured to an automobile body B through means of the stud clip 1A of the present invention, the fuel pipe P is first installed within the stud clip 1A of the present invention by inserting the same into the socket or recessed portion of the pipe holding arm 42 of the pipe holding fixture 41. In particular, as the fuel pipe P is inserted into the pipe holding arm 42 by moving the fuel pipe P upwardly, the pipe retaining arm 43 is pivotably bent toward the side wall 13 of the housing 11 so as to permit the fuel pipe P to be inserted into the pipe holding arm 42, and once the fuel pipe P has been fully inserted within the socket or recessed portion of the pipe holding arm 42, the inherent elasticity of the pipe retaining arm 43 causes the latter to return to its normal unbiased position as shown in FIGS. 1 and 3 whereby the pipe retaining arm 43 engages the outer periphery of the fuel pipe P so as to maintain the same fixed within the pipe holding arm 42. The assembly of the fuel pipe P and the stud clip 1A is now ready to be mounted or affixed upon the automobile body B as a result of the mounting of the stud clip 1A upon the stud bolt S projecting upwardly from the automobile body B.

More particularly, after the stud bolt S has been affixed to the automobile body B by any suitable means, such as, for example, welding, the stud clip assembly is disposed over the free distal end of the stud bolt S such that the free distal end of the stub bolt S is inserted through the through-aperture 12h defined within the lower wall 12 of the stud clip housing 11, and the flange f of the stud bolt S is accommodated within the recessed portion 12d of the lower wall 12 of the stud clip housing 11. As the stud bolt S is inserted into the interior cavity 13h of the housing 11, the stud bolt S encounters the latch members or detents 21d and 21u whereby such members or detents 21d and 21u are expanded radially outwardly so as to permit the insertion of the stud bolt S into the interior cavity 13h of the housing 11 with the latch members or detents 21d and 21u engaging the threaded portion e of the stud bolt S by means of the inherent elasticity of such latch members or detents 21d and 21u. In view of the relatively thin thickness dimensions of the proximal end portions 23 of the lower latch members or detents 21d which permits the lower latch members or detents 21d to be easily bent or flexed, as well as the aforenoted angular inclinations of the upper latch members 21u, the insertion force characteristic of the stud clip 1A of the present invention is relatively low or small whereby the stud bolt S can be easily and readily inserted into the interior cavity 13h of the stud clip 1A.

Alternatively, if the stud clip 1A is attempted to be removed from the stud bolt S, the lower latch members or detents 21d tend to be bent or flexed downwardly, however, when such latch members or detents 21d attempt to undergo such downward movements, they encounter the stop members 31 which effectively stop or prevent the lower latch members or detents 21d from undergoing such downward movements whereby the lower latch members or detents 21d, and particularly the claw portions 22 thereof, remain fixedly engaged with the threaded portion e of the threaded stud bolt S such that the release, removal, or pull-out force characteristic of the stud clip 1A with respect to the stud bolt S is substantially increased. It is further noted that if only the lower latch members or detents 21d were provided upon the stud clip 1A in conjunction with the stopper members 31, rattling movement and noise would be generated as the stud clip 1A undergoes its limited axial movement relative to the stud bolt S as predetermined by means of the axial spacing defined between, for example, the claw portions 22 of the lower latch members or detents 21d and the stopper members 31. However, in view of the additional provision of the upper latch members or detents 21u, and in view of the larger or greater thickness dimensions of such upper latch members or detents 21u with respect to the thickness dimensions of the proximal end portions 23 of the lower latch members or detents 21d, the upper latch members or detents 21u exhibit increased rigidity and therefore remain tightly engaged with the threaded portion e of the threaded stud bolt S so as to retain the stud clip 1A at its previously fixed axial position relative to stud bolt S such that the stud clip 1A does not experience or generate any rattling or vibrational noise.

It is noted that upper wall 14 of the stud clip housing 11 is provided with an aperture 14h through which the free distal end of the stud bolt S can extend if the stud bolt S has a length dimension which requires such an accommodation. In addition, while the stud clip 1A of the present invention comprises two sets of oppositely disposed latch members or detents 21d,21u, the stud clip 1A could be provided with three or more sets of latch members or detents 21d,21u disposed equiangularly around the internal periphery of the stud clip 1A. Still further, while the lower latch members or detents 21d have been disclosed as comprising different portions 22 and 23 having different thickness dimensions, the lower latch members or detents 21d could have uniform thickness dimensions throughout the extents thereof as long as the thickness dimensions of such lower latch members or detents are less than the thickness dimensions of the per latch members or detents 21u. Still yet further, the stud clip 1A of the present invention would likewise be operable in a similar manner if the relative dispositions of the upper and lower latch members or detents 21u and 21d, along with the stopper members 31, were reversed. Lastly, while the stud clip 1A of the present invention has been disclosed in connection with the support of an automobile fuel pipe P upon the automobile body B, the present invention is equally applicable to supporting or securing cables, wires, other conduits, or heat insulation materials upon the automobile body B or upon any other similar type of substrate or base member.

Thus it may be seen that in accordance with the present invention, a new and improved stud clip has been developed whereby the stud clip exhibits or facilitates relatively small or low insertion force characteristics and relatively high or large pull-out, retention, withdrawal, or removal characteristics. In addition, the stud clip addresses the problem of the development of rattling or vibrational noise and the effective elimination of such problem attendant the attempted pull-out or pull-off movement of the stud clip 1A and the stud bolt S with respect to each other.

Obviously, many modifications and variations of the present invention are possible in light of the above teachings. It is therefore to be understood that within the scope of the appended claims, the present invention may be practiced otherwise than as specifically described herein.

What is claimed as new and desired to be protected by Letters Patent of the United States of America is:

1. A stud clip, comprising:

a housing having an interior cavity defined therein;

aperture means defined within a wall of said housing for permitting insertion of a threaded stud bolt into said cavity defined within said housing;

resiliently flexible latch means disposed within said cavity defined within said housing for engaging said threaded stud bolt and for being movable in a first expansible direction to a predetermined extent by said threaded stud bolt when said threaded stud bolt is inserted into said cavity defined within said housing such that said expansible movement of said resiliently flexible latch means to said predetermined extent determines an insertion force characteristic of said stud clip which is necessary to insert said threaded stud bolt into said cavity defined within said housing and for mounting said stud clip upon said stud bolt; and means disposed within said cavity defined within said housing for engaging said resiliently flexible latch means and for preventing any substantial movement of said resiliently flexible latch means in a second opposite contracted direction by said threaded stud bolt engaged with said stud clip when said stud clip is attempted to be removed from said stud bolt and said stud bolt is attempted to be withdrawn from said interior cavity of said housing such that said resiliently flexible latch means are prevented from being readily disengaged from said threaded stud bolt and are caused to remain engaged with said threaded stud bolt so as to determine a substantially increased withdrawal force characteristic of said stud clip which is greater than said insertion force characteristic of said stud clip.

2. A stud clip as set forth in claim 1, wherein:

said latch means comprises two sets of oppositely disposed latch members for engaging opposite sides of a threaded shank portion of said threaded stud bolt.

3. A stud clip as set forth in claim 2, wherein:

each one of said two sets of oppositely disposed latch members comprises a tiered array of said latch members.

4. A stud clip as set forth in claim 1, wherein:

said means for preventing said movement of said latch means in said second opposite direction comprises stop means disposed adjacent to said latch means.

5. A stud clip as set forth in claim 4, wherein:

said housing has a vertically extending longitudinal axis;

said latch means are disposed substantially radially within said cavity of said housing; and said stop means are disposed axially beneath said latch means for preventing downward movement of said latch means in said second opposite direction.

6. A stud clip as set forth in claim 5, further comprising:

additional resiliently flexible latch means disposed within said cavity defined within said housing for engaging said threaded stud bolt so as to retain said stud clip at a predetermined axial position upon said threaded stud bolt when said stud clip is attempted to be removed from said stud bolt so as to eliminate rattling vibrational noise.

7. A stud clip as set forth in claim 6, wherein:

said additional latch means have thickness dimensions which are greater than the thickness dimensions of said latch means.

8. A stud clip as set forth in claim 6, wherein:

said additional latch means comprises two sets of oppositely disposed latch members for engaging opposite sides of a threaded shank portion of said threaded stud bolt.

9. A stud clip as set forth in claim 8, wherein:

each one of said two sets of oppositely disposed latch members of said additional latch means comprises a tiered array of said latch members.

10. A stud clip as set forth in claim 6, wherein:

said additional latch means are disposed at a greater inclined angle with respect to said longitudinal axis of said housing than said latch means.

11. A stud clip as set forth in claim 1, further comprising:

means defined upon an exterior wall of said housing for supporting an elongate article.

12. A stud clip as set forth in claim 4, wherein:

said housing, said latch means, and said stop means comprise a one-piece molding fabricated from a synthetic resin material.

13. A stud clip, comprising:

a housing having an interior cavity defined therein;

aperture means defined within a wall of said housing for permitting insertion of a threaded stud bolt into said cavity defined within said housing;

resiliently flexible latch means disposed within said cavity defined within said housing for engaging said threaded stud bolt, for being bendably moved in a first expansible direction to a predetermined extent by said threaded stud bolt when said threaded stud bolt is inserted into said cavity defined within said housing so as to permit said threaded stud bolt to be inserted into said cavity defined within said housing, and for retaining said threaded stud bolt within said cavity defined within said housing; and means disposed within said cavity defined within said housing for engaging said resiliently flexible latch means and for preventing any substantial bendable movement of said resiliently flexible latch means in a second opposite contracted direction such that said resiliently flexible latch means are prevented from being readily disengaged from said threaded stud bolt whereby said threaded stud bolt remains inserted within said stud clip and said stud clip remains mounted upon said threaded stud bolt.

14. A stud clip as set forth in claim 13, wherein:

said latch means comprises two sets of oppositely disposed latch members for engaging opposite sides of a threaded shank portion of said threaded stud bolt.

15. A stud clip as set forth in claim 13, wherein:

said means for preventing said bendable movement of said latch means in said second opposite direction comprises stop means disposed adjacent to said latch means.

16. In combination, a stud clip for mounting an elongate article upon a base member, comprising:

a base member having a threaded stud bolt projecting outwardly therefrom;

a housing having an interior cavity defined therein;

aperture means defined within a wall of said housing for permitting insertion of said threaded stud bolt of said base member into said cavity defined within said housing;

means defined upon an exterior surface of said housing for mounting an elongate article;

resiliently flexible latch means disposed within said cavity defined within said housing for engaging said threaded stud bolt, for being bendably moved in a first expansible direction to a predetermined extent by said threaded stud bolt when said threaded stud bolt is inserted into said cavity defined within said housing so as to permit said threaded stud bolt to be inserted into said cavity defined within said housing, and for retaining said threaded stud bolt within said cavity defined within said housing; and Means disposed within said cavity defined within said housing for engaging said resiliently flexible latch means and for preventing any substantial bendable movement of said resiliently flexible latch means in a second opposite contracted direction such that said resiliently flexible latch means are prevented from being readily disengaged from said threaded stud bolt whereby said threaded stud bolt remains inserted within said stud clip and said stud clip remains mounted upon said threaded stud bolt.

17. The combination as set forth in claim 16, wherein:

said base member comprises an automobile body; and said elongate article comprises an automobile fuel pipe.

18. The combination as set forth in claim 16, wherein:

said latch means comprises two sets of oppositely disposed latch members for engaging opposite sides of a threaded shank portion of said threaded stud bolt.

19. The combination as set forth in claim 16, wherein:

said means for preventing said bendable movement of said latch means in said second opposite direction comprises stop means disposed adjacent to said latch means.

20. The combination as set forth in claim 19, wherein:

said housing, said means for mounting said elongate article, said latch means, and said stop means comprise a one-piece molding fabricated from a synthetic resin material.

* * * * *